United States Patent [19]
Scholl

[11] 3,727,769
[45] Apr. 17, 1973

[54] PRESTRESSED FILTER MEDIA

[75] Inventor: Howard O. Scholl, Louisville, Ky.

[73] Assignee: American Air Filter Company, Inc., Louisville, Ky.

[22] Filed: Apr. 14, 1971

[21] Appl. No.: 133,914

[52] U.S. Cl. ..................210/484, 53/38, 55/488, 55/500, 55/511, 55/514, 55/515, 55/529, 55/DIG. 31, 65/4, 156/199
[51] Int. Cl. .................................................B01d 25/04
[58] Field of Search........55/485-488, 500, 512-519, DIG. 31, 529; 65/4; 156/163, 166, 156/196, 176, 178, 199, 207, 210, 213, 250; 210/484; 161/119, 121; 53/38; 206/56 AA; 229/66

[56] References Cited

UNITED STATES PATENTS

| 2,138,874 | 12/1938 | Myers | 55/316 |
| 2,266,350 | 12/1941 | Womack | 210/489 |
| 2,789,663 | 4/1957 | Camp | 55/DIG. 31 |
| 3,009,627 | 11/1961 | Ottinger | 229/53 |
| 3,017,698 | 1/1962 | Hambrecht et al. | 55/DIG. 31 |
| 3,023,839 | 3/1962 | Best | 55/DIG. 31 |
| 3,279,157 | 10/1966 | Andersson-Sason | 55/485 |
| 3,583,459 | 6/1971 | Nappe | 161/43 |

Primary Examiner—Bernard Nozick
Attorney—Charles G. Lamb and Ralph B. Brick

[57] ABSTRACT

An improved fluid treating filter having a support frame disposed between at least two layers of filter media. The support frame is of unitary construction and bowed in a direction opposing the flow of a fluid. One layer of media is in communicative relation with the surface of the frame facing the flow of the fluid whereas the second layer is in communicative relation with the edges of the downstream surface of the frame and is in spaced relationship with the downstream surface. The filter may include a cover adaptable for outerfitting the filter wherein the cover has perforations for allowing the passage of the fluid therethrough.

12 Claims, 5 Drawing Figures

PATENTED APR 17 1973 3,727,769

INVENTOR.
BY HOWARD O. SCHOLL
Charles G. Lamb
ATTORNEY

INVENTOR.
BY HOWARD O. SCHOLL
Charles G. Lamb
ATTORNEY

PRESTRESSED FILTER MEDIA

BACKGROUND OF THE INVENTION

In the conditioning of air in air conditioners, furnaces and the like, the air to be processed is usually passed through a filter to remove particles of dust and other foreign matter. For many years filters utilizing fibrous material, such as fiberglas, as a filtering media, have been used for removing these undesirable particles from the air. These filters come in many sizes and shapes and are constructed by many different methods. One of the most common types of filters in use today is one in which a basic core of continuous glass fibers bound together by a resinuous coating is confined between two closely perforated sheets of bright brass. The perforated sheets are generally scrap from bottle plants and contain close circular orifices placed as closely together as possible. The circular orifices account for nearly 90 percent of the total sheet area. The fiberglas media and the two closely perforated sheets of bright brass are held together by an inwardly facing U-channel constructed of fiber board. These side pieces of fiber board are either stapled together at their ends to hold them intact with the perforated sheets or they are attached to the perforated sheet with an adhesive. Further, in some cases a narrow metal strip is added to extend diagonally across each face of the perforated sheet to give extra strength.

SUMMARY OF THE INVENTION

In the present invention, it is recognized that it is desirable to provide a filter which is inexpensive, but yet durable in present air filtering systems. Furthermore, it is recognized that it is desirable to provide a filter which is easily constructed. The present invention advantageously provides a straightforward arrangement for the preparation of a filter which may be utilized in furnaces, air-conditioners, and the like. The present invention further provides a method for preparing fluid treating filters having a support frame disposed between at least two layers of filter media. The present invention also provides for putting the filter under increasing tension with increasing fluid flow thereby preventing collapsing of the filter under strenuous operating conditions.

It has been found that by preparing a filter having a bow-like configured support and covering the outwardly bowed or convex surface of the support with filtering material and covering only the base or edge portion of the inwardly bowed or concave surface with filtering material, in operation it is possible to obtain increasing tension of the filter with increasing fluid flow. This is accomplished by positioning the filter in the fluid stream wherein the outwardly bowed surface is on the upstream side of the fluid stream. As the flow increases it exerts increasing pressure on the upstream side of the filter whereby the filter has a tendency to "flatten." However, since the downstream side of the filter has filter media secured to the base or edges of the bow, as the bow starts to flatten the media on the downstream side, the filter is pulled tight across the base thereby resisting the pressure of the flowing fluid to flatten the upstream side of the filter.

It has been found, quite unexpectedly, that the filter of the present invention demonstrates an increase in dust holding capacity over the filters presently in use. It is believed that as the fluid passing through the filter decreases in velocity in the open volumetric section inside the filter downstream and adjacent the support frame, this drop in velocity in combination with turbulence patterns caused by the support frame and the normal coagulation tendency caused by the adhesive on the upstream side of the filter results in the particules of foreign matter dropping out in the open volumetric section inside the filter. These particles then either drop by gravity to the bottom of the open volumetric section or are readily filtered out by the more dense downstream media. In both cases, the dust holding capacity is increased with less than the expected normal increase in pressure drop across the filter.

Various other features of the present invention will become obvious to those skilled in the art upon reading the disclose set forth hereinafter.

More particularly, the present invention provides a fluid treating filter comprising a first and a second layer of filter media with a support frame disposed therebetween; said support frame being of unitary construction and bow-shaped with an upstream and downstream surface; said first layer of filter media being in communicative relation with the upstream surface of said support frame; and said second layer of filter media being in communicative relation with the edges of said downstream surface of said support frame and in spaced relation with the interior of said downstream surface.

It is to be understood that the description of the examples of the present invention given hereinafter are not by way of limitation and various modifications within the scope of the present invention will occur to those skilled in the art upon reading the disclosure set forth hereinafter.

Referring to the drawings:

FIG. 1 discloses a schematic flow diagram of an inventive method for making a new and useful filter of the present invention;

Figure 1:
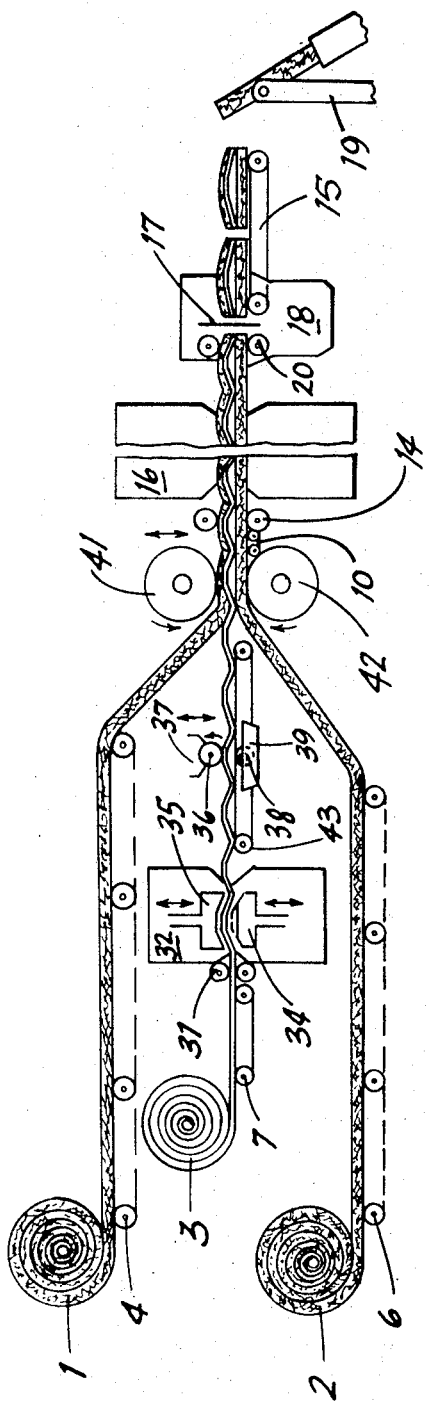

Referring to FIG. 1 of the drawings, in carrying out the present invention, fibrous filtering material which can be of low density and high permeability is fed from rolls 1 and 2 onto endless belt conveyors 4 and 6. The fibrous material fed from rolls 1 and 2 can advantageously be of the glass fibrous type, which is a preferred material used as the filter media in air filters. A porous support material, such as expanded metal, is fed from roll 3 onto an endless belt conveyor 7 simultaneously with and at the same rate as the material fed from rolls 1 and 2.

Expanded metal fed from roll 3 is fed to a forming machine 32 by conveyor 7. Guide rolls 31 are provided to guide the expanded metal into the machine 32 wherein upwardly extending ram 34 and downwardly extending ram 35 form the expanded metal into a specific bow-like configuration. The formed expanded metal is then transferred to endless belt conveyor 43 where it is conveyed to means for adding adhesive to the metal. The means for adding adhesive includes a first adhesive spreader 36 disposed beneath a hot melt pan 37. Spreader 36 rotates at a slightly higher rate of speed than conveyor 43 and is adapted to move in a vertical direction so that as the metal passes beneath the spreader 36, spreader 36 follows the contour of the convex surface of the metal, adding adhesive to the convex surface of the metal. Hot melt pan 37, disposed above the spreader 36, is adapted to deliver adhesive at a pre-determined rate to spreader 36. A second adhesive spreader 38 is disposed above hot melt pan 39 which holds an adhesive. Spreader 38 rotates at a slightly higher rate of speed than conveyor 43 and cones in contact with the adhesive in the hot-melt pan 39 and the base or edge of the concave side of the bow-like configured expanded metal.

Expanded metal leaving the adhesive adding means is then conveyed to an intersecting point with the fibrous material fed from rolls 1 and 2. Compression rolls 41 and 42 are provided to force the filter media from rolls 1 and 2 into direct contact with the expanded metal wherein the adhesive on the expanded metal will adhere to the fibrous material. Compression roll 41 is positioned above the filter media from roll 1 and rotates at a selected speed in the direction of travel of the fibrous material and the rotational axis is adapted for movement in a vertical direction so as to follow the contour of the fibrous material and the bow-like configured expanded metal. Compression roll 42 is positioned beneath the fibrous material from roll 2 and rotates at a selected speed in the direction of travel of the fibrous material. The rotational axis of roll 42 is fixed so that compression roll 42 rotates in only one plane as the fibrous material from roll 2 is to be in contact with only the base of the bow-like configured expanded metal. The filter sheet resulting from the combination of the fibrous material and expanded metal is then transferred to endless belt conveyor 10 and feed rolls 14 wherein the filter sheet moves into a curing chamber 16. The filter sheet is allowed to reside in the chamber for a period of time sufficient to set the adhesive. A curing chamber is not necessary for those adhesives which do not require a separate curing step.

When the curing step has been completed, the filter sheet is then guided by guide rolls 20 into housing 18 wherein a slitter 17 is positioned to slit the filter sheet into pads of selected lengths. The resulting pads may then be passed to a packaging jig 19 by means of endless belt conveyor 15 where they are packaged in plastic bags for preservation until use. The packaging jig 19 may include heat means (not shown) for sealing the plastic bags.

Figure 2:
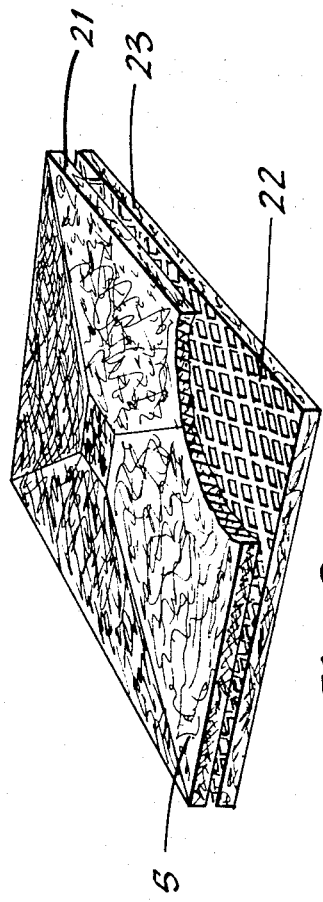
FIG. 2 is a perspective view of a filter of the present invention.
Figure 3:
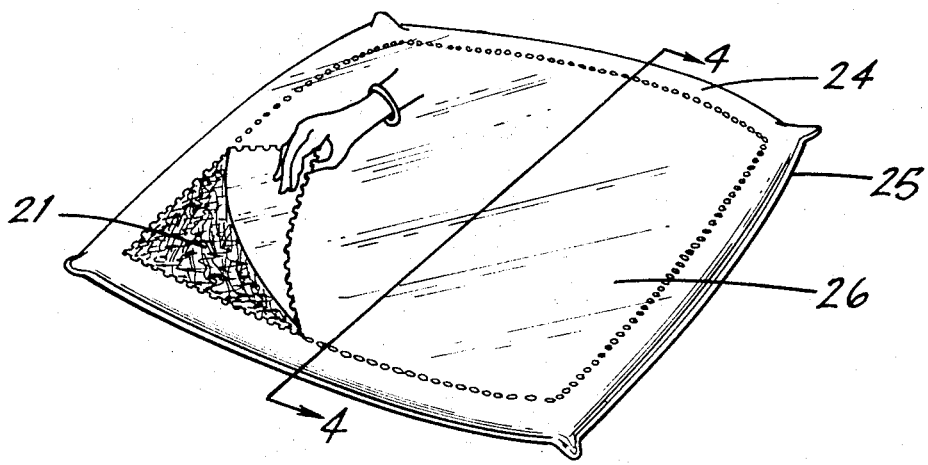
FIG. 3 is a perspective view of a filter of the present invention including a protective cover.

FIGS. 2 and 3 of the drawings, illustrate the structure of a filter 5 of the present invention. The filter 5 includes expanded metal support sheet 22 and fibrous layers of filter material 21 and 23. Expanded metal support sheet 22 having a bow-like configuration, shown in FIG. 3 as pyramid-like shaped, is shown to be disposed between the fibrous layers of filter materials 21 and 23. Fibrous filter material 21 is in communicative relation with the convex surface of the pyramid-like shaped support 22 whereas the fibrous filter material 23 is in communicative relation with the edges of the concave surface of support 22. As described previously, the expanded metal support 22 is held in contact with the fibrous filter layers of materials 21 and 23 by an adhesive (not shown) which is applied, for example, in the aforementioned described method of preparing a filter of the present invention. Other techniques for applying adhesives, such as spraying, may also be used without departing from the scope of the present invention. The adhesive generally used in the invention can be one that will flow slowly at high temperatures, such as 300°F, but upon cooling will become non-free flowing and tacky in order to hold the media to the support. This includes, for example, thermoplastic and thermosetting adhesives and mixtures thereof. However, other adhesives may be used without departing from the spirit and scope of the present invention.

Figure 4:
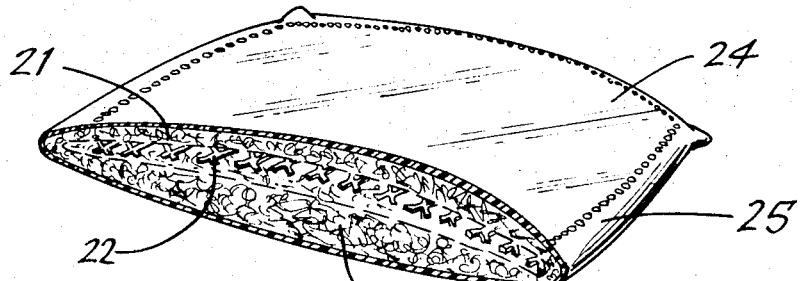
FIG. 4 is a sectional perspective view of FIG. 3 taken along line 4—4.

In FIG. 4, a protective cover 25 is provided to enclose the filter 5 as illustrated in FIG. 2. Protective cover 25 includes a border frame 24 and removable panels 26. Removable panels 26 are provided for the front and back of the filter, only one panel being illustrated, and are removed when ready to position the filter in an air filtering system. Border frame 24 is provided to enclose the outer edges of the filter 5 during operation. Materials which have been found to be acceptable as the protective cover in the present invention include, for example, polyethylene film having a thickness of 0.002 inches.

Figure 5:
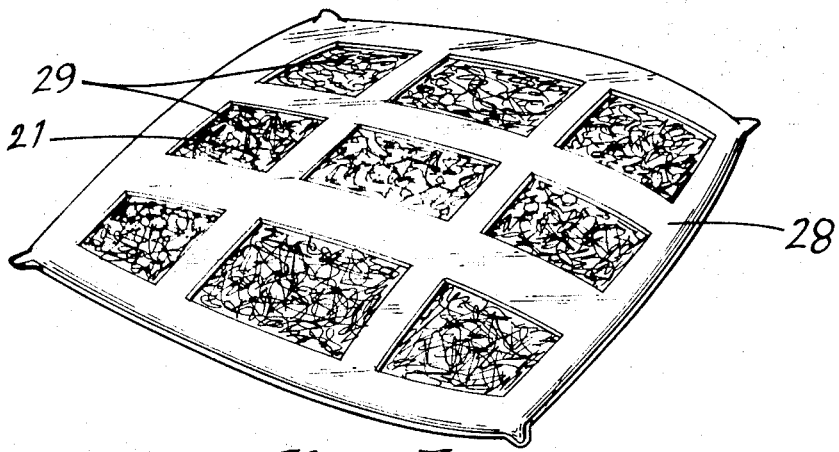
FIG. 5 is a perspective view of a filter of the present invention including an exterior frame.

In FIG. 5 an exterior frame 28 having appropriate apertures 29 therein is illustrated as another means of packaging the filter 5 of FIG. 2. Frame 28 is prepared from a flexible bag-type material (not shown), such as polyethylene or similar material, wherein appropriate apertures 29 have been pre-punched prior to inserting filter 5 therein. The particular design of the frame will depend upon the amount of filter area desired, thickness of the bag, as well as strength of the bag. However, for most applications, it is desirable for at least 80% of the filter to be exposed to the fluid to be filtered.

In the aforementioned example, expanded metal was illustrated as the inner support for the filter media but is is within the scope of this invention to include other materials which have a high percentage of open area and sufficient strength to support the filter media in operating position. These materials include screen wire, specially cut plastics, bottle cap scraps, and the like.

It will be realized that various changes may be made to the specific embodiments shown and described without departing from the principles and spirit of the present invention.

What is claimed is:

1. A fluid treating filter comprising: first and second sheet layers of filter media with a perforate sheet support frame disposed therebetween; said support frame being bow-shaped with an upstream and downstream surface; said first layer of filter media being bow shaped in contacting relation with the upstream surface of said support frame; and said second layer of filter media being secured to the peripheral edge of said downstream surface of said support frame and in spaced relation with the remainder of said downstream surface and means for securing said layers of filter media to said support frame at their peripheries.

2. The filter of claim 1, said support frame being pyramid-like shaped having sides and an open base.

3. The filter of claim 1, said edges of said downstream surface forming a base of rectangular configuration.

4. The filter of claim 1 wherein said support frame is expanded metal.

5. The filter of claim 1 wherein an adhesive is added to said first layer of filter media to adhere said media to the convex side of said bow-shaped support frame and an adhesive is added to the edges of said second layer of filter media to adhere said media to the edges of the concave side of said bow-shaped support frame.

6. The filter of claim 1 including a cover adapted to outerfit and envelope said layers of filter media thereby providing said cover with a front and back wall, said cover having perforate lines extending along said front and said back walls whereby sections of said walls enclosed with said perforate lines may be easily removed when placed in operating position.

7. The filter of claim 6 wherein said cover is formed of a single sheet of flexible material.

8. The filter of claim 6 wherein said cover is formed of a single sheet of polyethylene.

9. The filter of claim 6 wherein said perforate lines are parallel with and a short distance inward from the outer edge of said front and back walls to define an opening.

10. The filter of claim 6 wherein said cover is a plastic bag.

11. The filter of claim 10 wherein said plastic bag is a polyethylene plastic bag.

12. The filter of claim 10 wherein said plastic bag is open at one end and sealable by heat means.

* * * * *